United States Patent [19]

Mrozik

[11] 3,719,707

[45] March 6, 1973

[54] POLYHALOALKOXY SALICYLANILIDES AND THIOS ALICYLANILIDES

[75] Inventor: Helmut H. Mrozik, Matawan, N.J.

[73] Assignee: Merck & Co., Inc., Rahway, N.J.

[22] Filed: Aug. 3, 1971

[21] Appl. No.: 168,741

Related U.S. Application Data

[63] Continuation-in-part of Ser. No. 856,213, Sept. 8, 1969, abandoned.

[52] U.S. Cl. ............260/551 S, 260/480, 260/559 S, 260/575, 260/612 D, 260/646, 424/320, 424/324
[51] Int. Cl. ........................................C07c 103/32
[58] Field of Search..................260/559, 479, 551, 74

[56] References Cited

UNITED STATES PATENTS 3,142,703    7/1964    Stecker ................................260/559

*Primary Examiner*—Harry I. Moatz
*Attorney*—I. Louis Wolk et al.

[57] ABSTRACT

There are provided novel salicylanilides and thiosalicylanilides substituted with halogen and polyhalogenated ethoxy which are useful as antibacterial and anthelmintic agents. The substituted salicylanilides and thiosalicylanilides are prepared by condensing the desired aniline ether with the corresponding salicylic acid or salicylic acid halides.

7 Claims, No Drawings

POLYHALOALKOXY SALICYLANILIDES AND THIOSALICYLANILIDES

RELATIONSHIP TO OTHER APPLICATIONS

This application is a continuation-in-part of my copending application Ser. No. 856,213, filed Sept. 8, 1969. now abandoned.

DESCRIPTION OF THE PRIOR ART

Salicylic acid and its derivatives have been of interest since the earliest days of synthetic chemotherapy. Acetylsalicylic acid or aspirin was one of the earliest synthetic analgetics. Thus, the compounds of this class have usually been investigated with a view to enhancing their analgetic activity or their antipyretic activity. Recently it has also been found that certain salicylanilides and derivatives thereof including salicylanilides ethers have antibacterial activity.

SUMMARY OF THE INVENTION

The compounds of the present invention have the following general formula:

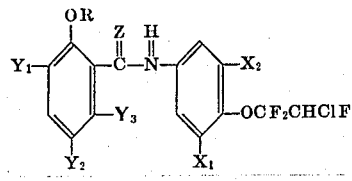

wherein $X_1$ is halogen and $X_2$ is hydrogen or halogen; $Y_1$ and $Y_2$ are halogen: $Y_3$ is hydrogen or hydroxyl, Z is oxygen or sulfur, and R is hydrogen or loweralkanoyl of from two to four carbon atoms.

The novel ethers of the present invention can be prepared by reacting the corresponding aniline ether (III) and salicylic acid or acid halide or derivative thereof (II) in accordance with the reaction shown below:

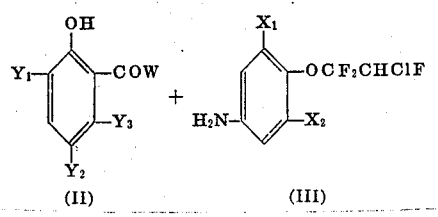

where W is hydroxyl or halogen, and $Y_1$, $Y_2$, $Y_3$, $X_1$ and $X_2$ are as previously defined.

The substituted aniline ethers used as starting materials are known in the art, or can be prepared by methods known to those skilled in the art from the corresponding nitrophenol ethers by reduction of the nitro group to an amino group.

The ether thus produced is then coupled with the corresponding salicylic acid in the usual manner. The novel thiosalicylanilide ethers may be prepared by reacting an appropriately substituted phenol with an appropriately substituted halogenated alkoxyphenylisothicoyanate.

Where it is desired to produce a salicylanilide such as, for example, 3,5-dibromo-3'-chloro-4'-($\beta$-chloro-$\alpha,\alpha,\beta$ triflurorethoxy)salicylanilide, the intermediate polyhaloalkoxynitrobenzene is prepared by reacting the corresponding nitrophenol with the requisite $\alpha$-chloro-$\alpha,\alpha$, $\beta$-trifluoroethene in the presence of a basic catalyst. In this procedure the nitrophenol is taken up in a suitable inert solvent, such as dimethylformamide, or the like, together with a small excess, suitably from 5 to 15 percent excess, of the polyhaloalkene. To this mixture is added a basic catalyst such as sodium hydride or sodium hydroxide in order to prepare the phenolate. There is utilized between 5 and 15 mole percent of the basic catalyst relative to the other reactants. The mixture is then introduced into a pressure bomb, and heated to a temperature of from 120° to 180°C. for from 8 to 15 hours. The polyhaloalkoxynitrobenzene compound is then obtained from the reaction mixture by methods known to those skilled in the art.

In the preferred procedure the mixture is quenched by pouring it onto ice and water, and the polyhaloalkoxynitrobenzene compound is obtained by then extracting the resultant product with a suitable water immiscible solvent such as ether, chloroform, methylene chloride, and the like. The polyhaloalkoxynitrobenzene is then reduced to the corresponding aniline, preferably by catalytic reduction.

Where it is desired to produce the corresponding thiosalicylanilides, the appropriate aniline ether (III) is prepared as set forth hereinabove and converted to the corresponding phenylisothiocyanate ether by reaction with thiophosgene. In the preferred modification the aniline ether is taken up in a suitable inert organic solvent such as benzene, toluene, and the like and the thiophosgene added thereto at ambient temperatures. Upon completion of The addition, the mixture is heated under reflux for from about 1 to about 3 hours, the solvent removed in vacuo, and the residue purified by methods known to those skilled in the art.

The thus prepared phenylisothiocyanate ethers are then reacted with the corresponding phenol rather than with the corresponding salicylic acid as in the procedure set forth hereinabove. the reactants are heated with a Lewis acid, suitably an anhydrous metal halide, such as aluminum chloride, boron trifluoride, stannic chloride, zinc chloride or the like. If desired a solvent may be utilized, and when utilized an inert organic solvent such as a halogenated hydrocarbon suitably carbon tetrachloride or mono- or polychlorobenzene, or carbon disulfide is suitable. The initial reaction is usually endothermic, and the mixture is allowed to stand at ambient temperatures for from about 5 to 12 hours after which time it is heated to about 60°C. to about 150°C. for about 4 to about 8 hours to complete the reaction. The reaction product is then isolated by techniques known in the art.

In a suitable mode of isolation the reaction mixture is poured onto a mixture of a mineral acid, such as hydrochloric acid, and ice: the organic residue is separated from the acid, and ice; the organic residue is separated from the aqueous phase, and dissolved in dilute aqueous alkali, for example, sodium hydroxide or potassium hydroxide. The alkaline solution is then filtered, acidified with dilute acid, suitably acetic acid, and the thiosalicylanilide is collected and purified by techniques known by those skilled in the art. The desired thiosalicylanilide may then be further purified by recrystallization from a suitable solvent such as, for example, petroleum-ether benzene mixtures.

The acetyl derivatives of the polyhaloalkoxysalicylanilides and thiosalicylanilides is readily prepared by treating the salicylanilide or thiosalicylanilide with an acetylating agent such as acetic anhydride at a temperature of from room temperature to the reflux temperature of the reaction mixture for a duration of from 1 to 6 hours. A solvent is not required; however, where one is desired an aproteic solvent such as benzene, toluene, carbon tetrachloride and the like is desired.

Among the compounds falling within the scope of the present invention are the following:
3,5-dibromo-3'-chloro-4'-($\beta$-chloro-$\alpha,\alpha,\beta$-trifluoroethoxy)-salicylanilide,
3,5-diiodo-3',5'-dichloro-4'-($\beta$-chloro-$\alpha,\alpha,\beta$-trifluoroethoxy)-salicylanilide,
3,5-dibromo-3',5'-dichloro-4'-($\beta$-chloro-$\alpha,\alpha,\beta$-trifluoroethoxy)-salicylanilide,
3,5-dibromo-3'-chloro-4'-($\beta$-chloro-$\alpha,\alpha,\beta$-trifluoroethoxy)-thiosalicylanilide,
2-acetoxy-3,5-dibromo-3'-chloro-4'-($\beta$-chloro-$\alpha,\alpha,\beta$-trifluoroethoxy)-benzanilide,
3,5-diiodo-3'-chloro-4'-($\beta$-chloro-$\alpha,\alpha,\beta$-trifluoroethoxy)-2-hydroxythiobenzanilide,
3,5-dibromo-2,6-dihydroxy-3'-chloro-4'-($\beta$-chloro-$\alpha$, $\alpha,\beta$-trifluoroethoxy)-benzanilide.

The compounds of the instant invention find utility as antibacterial and anthelmintic agents being particularly active against liver fluke infections in sheep and cattle. The compounds are administered to the animal afflicted with a liver fluke infection either orally or parenterally although oral administration is generally preferred. When the compounds are orally administered it may be as a unit dosage form such as a tablet, capsule, drench and the like, or as an integral component of the animal's feed. The medicated feed is usually prepared from a feed additive concentrate which is uniformly mixed with the animal's regular feed. The active component must be present in the administrative form in such an amount as to kill the liver fluke, but not such an amount as to have toxic effects on the host animal.

So that the invention might be more fully understood, the following examples are presented. They should not be construed as being limitative of the invention.

EXAMPLE 1

3,5-Dibromo-3'-chloro-4-($\beta$-chloro-$\alpha,\alpha,\beta$-trifluoroethoxy)-salicylanilide A. 3-Chloro-4-($\beta$-chloro-$\alpha,\alpha,\beta$-trifluoroethoxy-aniline 48.9 G. of 2-chloro-4-nitrophenol and 36 g. of trifluorochloroethylene are charged to an autoclave bomb containing 150 ml. of dimethylformamide and 0.61 g. of sodium hydride. The bomb is sealed and heated to 150°C. for 10 hours. The mixture is cooled, poured onto ice water, and extracted with chloroform. The extracts are washed with water, aqueous sodium carbonate, dried over sodium sulfate, filtered, the filtrate evaporated and the residue azeotroped with benzene. Upon evaporation there is given 1-chloro-2-(trifluorochloroethoxy)-5-nitrobenzene. 40.2 G. of 1-chloro-2-(trifluorochloroethoxy)-5-nitrobenzene are taken up in 400 ml. of ethanol, and charged to an autoclave together with 2 teaspoons of Raney nickel.

Hydrogen at an initial pressure of 41 p.s.i. at 24°C. is charged to the sealed bomb and the autoclave agitated for 5 hours. the pressure is then released, and the reaction product poured onto ice water and extracted with ether. The ether layer is then washed with aqueous sodium carbonate, and water, dried over magnesium sulfate, filtered, and the filtrate is evaporated. The residue is then azeotroped with benzene to yield, upon evaporation of the solvent, 3-chloro-4-($\alpha$-chloro-$\alpha$, $\alpha$, $\beta$-trifluoroethoxy)-aniline.

When in the above procedure 2,6-dichloro-4-nitrophenol is employed in place of 2-chloro-4nitrophenol, there is obtained 3,5-dichloro-4-($\beta$-chloro-$\alpha,\alpha$, $\beta$-trifluoroethoxyaniline.

B. 3,5-Dibromo-3'-chloro-4'-($\beta$-chloro-$\alpha,\alpha,\beta$-trifluoroethoxy)-salicylanilide 47 G. of 3-chloro-4-($\beta$-chloro-$\alpha$, $\alpha$, $\beta$-trifluoroethoxy)-aniline, and 51.2 g. of 3,5-dibromosalicylic acid are taken up in 520 ml. of chlorobenzene. The mixture is heated under reflux and any residual hydroxylic solvents are removed as an azeotropic mixture. The reaction mixture is then cooled to ca 100°C. and 6.1 ml. of phosphorus trichloride are added over a period of approximately 1 minute. The mixture is then heated under reflux for 3 hours, filtered hot, and the filtrate evaporated to dryness. The residue is triturated with petroleum ether and the resulting crystalline product recrystallized from benzene to yield 3,5-dibromo-3'-chloro-4'-($\alpha$-chloro-$\alpha,\alpha,\beta$-trifluoroethoxy)-salicylanilide, m.p. 126°–129°C.

When in the above procedure 3,5-dichloro-4-($\beta$-chloro-$\alpha,\alpha,\beta$-trifluoroethoxy)-aniline is employed in place of 3-chloro-4-($\beta$-chloro-$\alpha,\alpha,\beta$-trifluoroethoxy)-aniline, there is obtained 3,5-dibromo-3',5'-dichloro-4'-($\beta$-chloro-$\alpha,\alpha,\beta$-trifluoroethoxy)-salicylanilide.

EXAMPLE 2

2-Acetoxy-3,5-dibromo-3'-chloro-4'-($\beta$-chloro-$\alpha,\alpha,\beta$-trifluorpethoxy)-benzanilide 4.5 G. of 3,5-dibromo-3'chloro-4'($\beta$-chloro-$\alpha,\alpha$, $\beta$-trifluoroethoxy)-salicylanilide and 225 ml. of acetic anhydride are heated at 100°C. for 3 hours. The reaction mixture is poured onto ice and extracted with benzene. The benzene solution is dried and concentrated until the product starts to crystallize. The suspension is cooled and filtered affording 2-acetoxy-3,5-dibromo-3'-chloro-4'-($\beta$-chloro-$\alpha,\alpha,\beta$-trifluoroethoxy)-benzanilide.

EXAMPLE 3

3,5-Diiodo-3'-chloro-4'-($\beta$-chloro-$\alpha,\alpha,\beta$-trifluoroethoxy)-2-hydroxythiobenzanilide A. 3-Chloro-4'-($\beta$-chloro-$\alpha,\alpha,\beta$-trifluoroethoxy)-phenylisothiocyanate 52 G. (0.2 mole) of 3-chloro-4'-$\beta$-chloro-$\alpha$, $\alpha$, $\beta$-trichloromethoxy)-aniline is dissolved in 3 ml. of toluene. 28.5 G. (0.25 mole) of thiophosgene is added dropwise to the toluene solution as the temperature rises to 50°C. and a thick precipitate forms. When the thiophosgene addition is complete, the mixture is refluxed for 1 hour, the solution filtered hot, and the filtrate evaporated to dryness. 3-chloro-4'-($\beta$-chloro-$\alpha,\alpha$, $\beta$-trifluoroethoxy)-phenylisothiocyanate is obtained and is used in the next step without further purification.

B. 3,5-Diiodo-3'-chloro-4'-(β-chloro-α,α,β-trifluoroethoxy)-2-hydroxythiobenzanilide A mixture of 35 g. (0.1 mole) of 2,4-diiodo and 30 g. (0.1 mole) of 3-chloro-4'-(β-chloro-α,α,β-trifluoroethoxy)-phenylisothiocyanate is treated with 20 g. of anhydrous aluminum chloride and the mixture heated to 125°C. and maintained at that temperature for 15 hours. The reaction mixture is then poured onto a mixture of ice and hydrochloric acid. The oily residue which separates is removed and dissolved in dilute aqueous sodium hydroxide, filtered, and the filtrate acidified with acetic acid. The precipitate is filtered, washed with water, and recrystallized from an ether-petroleum benzene mixture affording pure 3,5-diiodo13'chloro-4'-(β-chloro-α, α,β-trifluoroethoxy)-2-hydroxythiobenzanilide.

EXAMPLE 4

3,5-Dibromo-2,6-dihydroxy-3'-chloro-4'-(β-chloro-α, α,β-trifluoroethoxy)-benzanilide A. 3'Chloro-4'-(β-chloro-α,α,β-trifluoroethoxy)-2,6-dihydroxybenzanilide A mixture of 13.8 g. (0.09 moles) of 2,6-dihydroxybenzoic acid, 23.5 g. (0.9 moles) of 3-chloro-4'-(β-chloro-α,α,β-trifluoroethoxyaniline), 215 ml. of chlorobenzene and 3.04 ml. of phosphorous trichloride is refluxed for 3 hours. The hot reaction mixture is decanted and the solution slowly cooled to 0°C. Petroleum benzene is added and 3'-chloro-4'-(β-chloro-αα,β-trifluoroethoxy)-2,6-dihydroxybenzanilide precipitates and is filtered.

B. 3,5-Dibromo-2,6-dihydroxy-3'-chloro-4'-(β-chloro-α,α,β-trifluoroethoxy)-benzanilide 4.0 G. (0.01 moles) of 3'-chloro-2,6-dihydroxy-4'-(β-chloro-α,α, β-trifluoroethoxy)-benzanilide is dissolved in 200 ml. of ether. 3.2 G. (1.0 ml. 0.02 mole) of liquid bromine is added dropwise with stirring over a 15 minute period. The reaction mixture is concentrated and the product filtered. The solvent material is washed with petroleum benzene affording pure 3,5-dibromo-2,6-dihydroxy-3'-chloro-4'-(β-chloro-α,α,β-trifluoroethoxy)-benzanilide.

What is claimed is:

1. A compound having the formula:

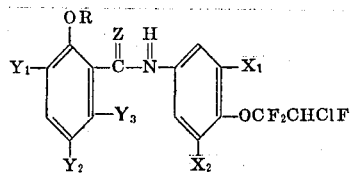

wherein $X_1$ is halogen and $X_2$ is hydrogen or halogen; $Y_1$ and $Y_2$ are halogen; $Y_3$ is hydrogen or hydroxyl, Z is oxygen or sulfur, and R is hydrogen or loweralkanolyl, 2. The compound of Claim 1 wherein Z is oxygen.

3. The compound of claim 2 which is 3,5-dibromo-3', 5'-dichloro-4'-(β-chloro-α,αβ-trifluoroethoxy)-salicylanilide.

4. The compound of claim 2 which is 3,5-diiodo-3'-chloro-4'-(β-chloro-α,α,β-trifluorethoxy)-salicylanilide.

5. The compound of claim 1 wherein Z is sulfur.

6. The compound of claim 5 which is 3,5-dibromo-3'-chloro-4'-(β-chloro-α,α,β-trifluoroethoxy)-thiosalicyl-anilide.

7. The compound of claim 5 which is 3,5-diiodo-3',5'-dibromo-4'(β-chloro-α,α,β-trifluoroethoxy)-thiosalicylanide.

* * * * *